(12) United States Patent
Guntaka et al.

(10) Patent No.: US 10,262,601 B1
(45) Date of Patent: Apr. 16, 2019

(54) ELECTROWETTING DISPLAY DEVICE WITH AMBIENT LIGHT DETECTION

(71) Applicant: Amazon Technologies, Inc., Seattle, WA (US)

(72) Inventors: Tulasi Sridhar Reddy Guntaka, Eindhoven (NL); Pavel Novoselov, Eindhoven (NL); Gor Manukyan, Veldhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 14/752,478

(22) Filed: Jun. 26, 2015

(51) Int. Cl.
*G09G 3/34* (2006.01)
*G02B 26/00* (2006.01)

(52) U.S. Cl.
CPC .......... *G09G 3/348* (2013.01); *G02B 26/005* (2013.01); *G09G 2300/0404* (2013.01); *G09G 2300/0456* (2013.01); *G09G 2300/0465* (2013.01); *G09G 2360/144* (2013.01)

(58) Field of Classification Search
CPC .......... G09G 3/348; G09G 2300/0456; G09G 2300/0404; G09G 2300/0465; G09G 2360/144; G02B 26/004; G02B 26/005; G02B 26/08; G02B 26/0816
See application file for complete search history.

(56) References Cited

U.S. PATENT DOCUMENTS

| | | | | |
|---|---|---|---|---|
| 2009/0085876 A1* | 4/2009 | Tschirhart | ............... | G06T 15/60 345/173 |
| 2011/0007046 A1* | 1/2011 | Tsai | .................... | G02B 26/005 345/207 |
| 2012/0256898 A1* | 10/2012 | Aubert | ................. | G09G 3/3433 345/212 |
| 2013/0076712 A1* | 3/2013 | Zheng | ....................... | G01J 1/32 345/207 |
| 2013/0271438 A1* | 10/2013 | Aflatooni | ............. | G09G 3/3466 345/207 |

* cited by examiner

*Primary Examiner* — David Tung
(74) *Attorney, Agent, or Firm* — EIP US LLP

(57) ABSTRACT

An electrowetting display device includes a first support plate and a second support plate. The first support plate has rows and columns of pixel walls defining individual electrowetting pixels. A first fluid and a second fluid immiscible with the first fluid are between the first support plate and the second support plate. A sensor is coupled to the second support plate and configured to detect a first intensity of light incident upon the second support plate at a first angle. A controller is configured to displace the first fluid in either a first direction or a second direction based at least in part upon the first intensity of light detected by the sensor.

18 Claims, 9 Drawing Sheets

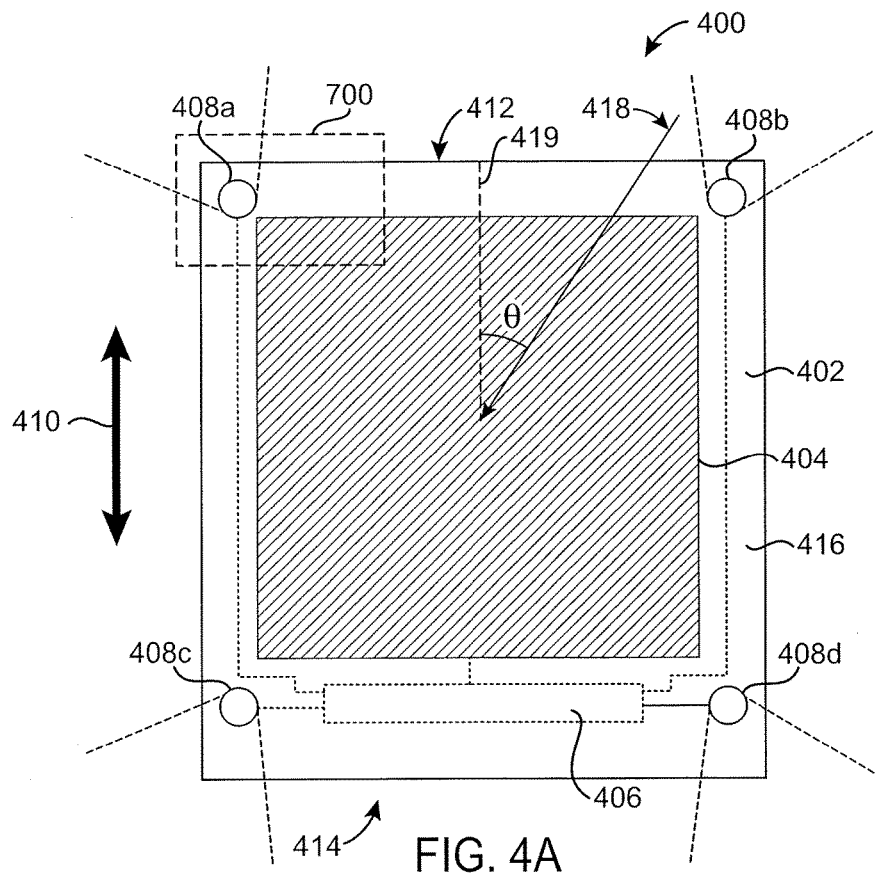
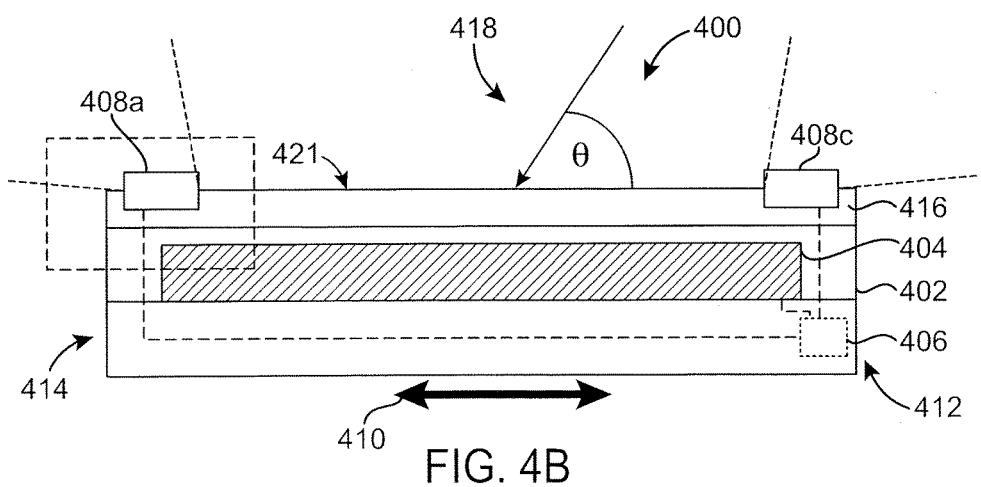

ELECTROWETTING DISPLAY DEVICE WITH AMBIENT LIGHT DETECTION

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designing, packaging, and fabricating display devices, as content available for mobile use becomes more extensive and device portability continues to be a high priority.

An electrowetting display includes an array of pixels individually bordered by pixel walls that retain liquid, such as an opaque oil, for example. Light transmission through each pixel is adjustable by electronically controlling a position of the liquid in the pixel. The quality of image generated by an electrowetting display can be affected by the position of the liquids within each pixel of the display with respect to the direction ambient light enters each pixel.

BRIEF DESCRIPTION OF THE DRAWINGS

The detailed description is set forth with reference to the accompanying figures. The use of the same reference numbers in different figures indicates similar or identical items or features.

FIGS. 4A and 4B are top and side views, respectively, of an example electrowetting display device configured to optimize fluid movement within the device's pixels based upon ambient light.

DETAILED DESCRIPTION

Figure 1A:
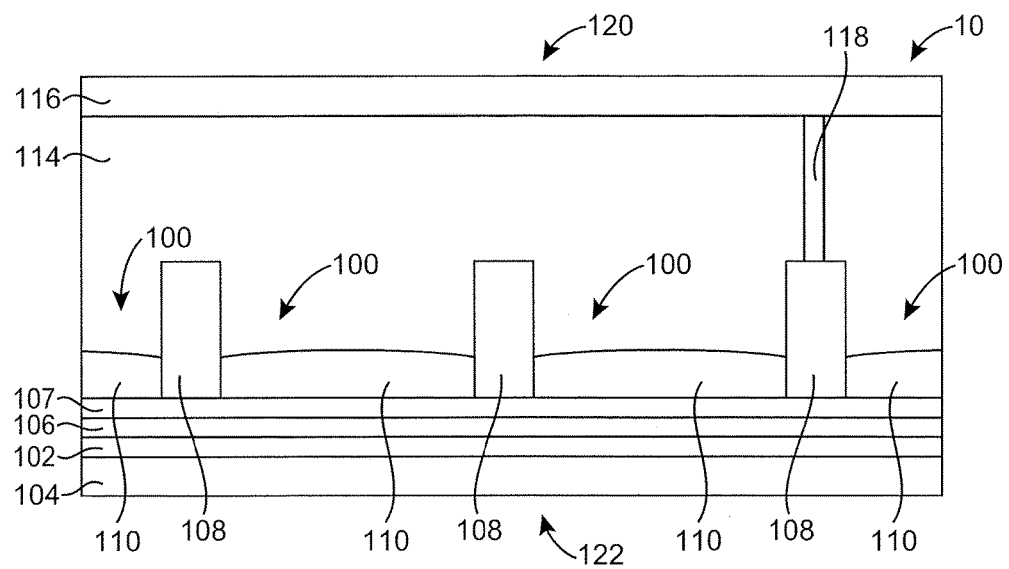
FIGS. 1A and 1B illustrate a cross-section of a portion of an example electrowetting display device, according to various embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like.

An electrowetting pixel is defined by a number of pixel walls that surround or are otherwise associated with at least a portion of the electrowetting pixel. The pixel walls form a structure that is configured to contain at least a portion of a first liquid, such as an opaque oil. Light transmission through the electrowetting pixel can then be controlled by the application of an electric potential to the electrowetting pixel, which results in a movement of a second liquid, such as an electrolyte solution, into the electrowetting pixel, thereby displacing the first liquid.

When the electrowetting pixel is in a rest state (i.e., with no electric potential applied), the opaque oil is distributed throughout the pixel. The oil absorbs light and the pixel in this condition appears black. But when the electric potential is applied, the oil is displaced to one side of the pixel. Light can then enter the pixel striking a reflective surface. The light then reflects out of the pixel, causing the pixel to appear white to an observer. If the reflective surface only reflects a portion of the light spectrum or if light filters are incorporated into the pixel structure, this may cause the pixel to have color.

When the oil is displaced, the oil forms a droplet against one of the walls of the pixel causing the pixel to be non-symmetrical. Because the pixel is non-symmetrical, the ability of the pixel to reflect light entering the pixel can be affected by the path or direction the light travels when entering the pixel. If light should enter the pixel over the wall against which the oil has accumulated, for example, the oil may obscure or block some of the light, resulting in a reduction in the reflectivity of the pixel. This reduction in reflectivity, in turn, reduces the perceived brightness of the pixel. Conversely, if light enters the pixel over a pixel wall against which the oil has not accumulated, the oil may not interfere with the light transmission allowing a maximum amount of light to enter the pixel and be reflected out. This can increase the perceived brightness level of the pixel.

To optimize the display performance, therefore, the disclosed system is configured to monitor and/or measure an angle of incidence of ambient light upon a surface of an electrowetting display. Based upon those measurements, a controller can optimize the electrowetting display to move the first fluid within one or more individual pixels of the display device in a particular direction to optimize the display's reflectance. To achieve this selectable oil movement, one embodiment of an electrowetting pixel is described that includes multiple transistor devices enabling a controlled movement of oil, for example, a direction of movement of oil, within an activated pixel.

A display device, such as an electrowetting display device, may be a transmissive, reflective or transflective display that generally includes an array of pixels (e.g., which may comprise subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each pixel. Transistors take up a relatively small fraction of the area of each pixel to allow light to efficiently pass through (or reflect from) the display pixel. Herein, a pixel may, unless otherwise specified, be made up of two or more subpixels of an electrowetting display device. Such a pixel or subpixel may be the smallest light transmissive, reflective or transflective pixel of a display that is individually operable to directly control an amount of light transmission through or reflection from the pixel. For example, in some embodiments, a pixel may comprise a red subpixel, a green subpixel, and a blue subpixel. In other embodiments, a pixel may be a smallest component, e.g., the pixel does not include any subpixels.

Electrowetting displays include an array of pixels sandwiched between two support plates, such as a bottom support plate and a top support plate. For example, a bottom support plate in cooperation with a top support plate may contain pixels that include electrowetting oil, electrolyte solution and pixel walls between the support plates. Support plates may include glass, plastic (e.g., a transparent thermoplastic such as a poly(methyl methacrylate) (PMMA) or other acrylic), or other transparent material and may be made of a rigid material or a flexible material, for example. Pixels include various layers of materials built upon a bottom support plate. One example layer is an amorphous fluoropolymer (AF) with hydrophobic behavior, around portions of which pixel walls are built.

Hereinafter, example embodiments include, but are not limited to, reflective electrowetting displays that include a clear or transparent top support plate and a bottom support plate, which need not be transparent. The clear top support plate may comprise glass or any of a number of transparent materials, such as transparent plastic, quartz, and semiconductors, for example, and claimed subject matter is not limited in this respect. "Top" and "bottom" as used herein to identify the support plates of an electrowetting display do not necessarily refer to a direction referenced to gravity or to a viewing side of the electrowetting display. Also, as used herein for the sake of convenience of describing example embodiments, the top support plate is that through which viewing of pixels of a (reflective) electrowetting display occurs.

In some embodiments, a reflective electrowetting display comprises an array of pixels sandwiched between a bottom support plate and a top support plate. The bottom support plate may be opaque while the top support plate is transparent. Herein, describing a pixel or material as being "transparent" means that the pixel or material may transmit a relatively large fraction of the light incident upon it. For example, a transparent material or layer may transmit more than 70% or 80% of the light incident upon its surface, though claimed subject matter is not limited in this respect.

Pixel walls retain at least a first fluid which is electrically non-conductive, such as an opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing. The second fluid is immiscible with the first fluid.

Individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue light) in the visible region of electromagnetic radiation. In some embodiments, the opaque liquid is a nonpolar electrowetting oil.

The opaque liquid is disposed in the liquid region. A coverage area of the opaque liquid on the bottom hydrophobic layer is electrically adjustable to affect the amount of light incident on the reflective electrowetting display that reaches the reflective material at the bottom of each pixel.

In addition to pixels, spacers and edge seals may also be located between the two support plates. The support plates may comprise any of a number of materials, such as plastic, glass, quartz, and semiconducting materials, for example, and claimed subject matter is not limited in this respect.

Spacers and edge seals which mechanically connect the first support plate with the second overlying support plate, or which form a separation between the first support plate and the second support plate, contribute to mechanical integrity of the electrowetting display. Edge seals, for example, being disposed along a periphery of an array of electrowetting pixels, may contribute to retaining fluids (e.g., the first and second fluids) between the first support plate and the second overlying support plate. Spacers can be at least partially transparent so as to not hinder throughput of light in the electrowetting display. The transparency of spacers may at least partially depend on the refractive index of the spacer material, which can be similar to or the same as the refractive indices of surrounding media. Spacers may also be chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image and/or video data. The code may cause the processor to modulate the optical properties of pixels by controlling electrical signals (e.g., voltages, currents, and fields) on, over, and/or in layers of the electrowetting display.

Figure 1B:
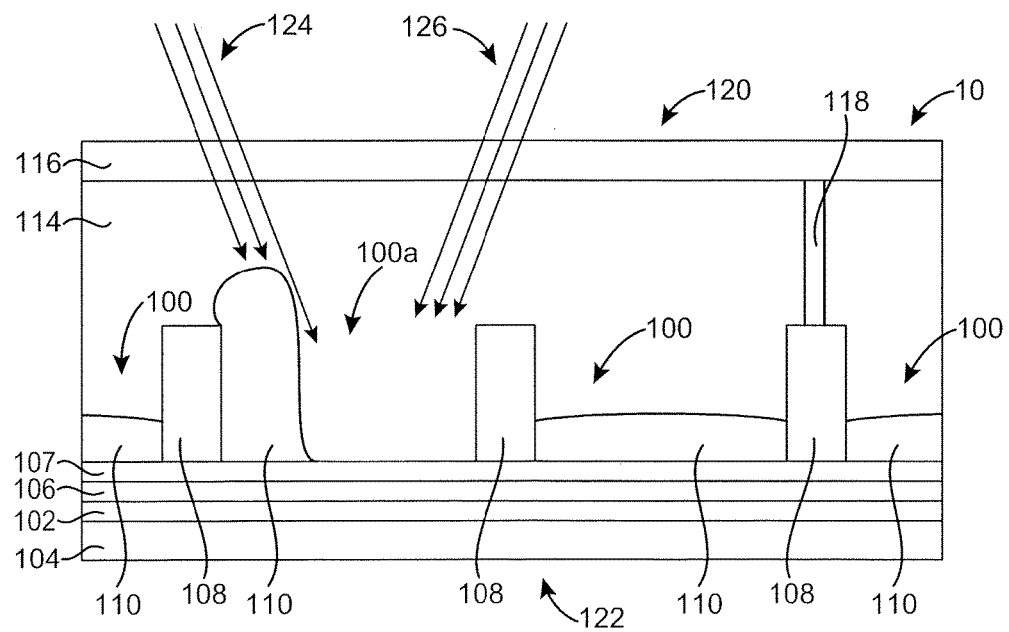
Figure 2:
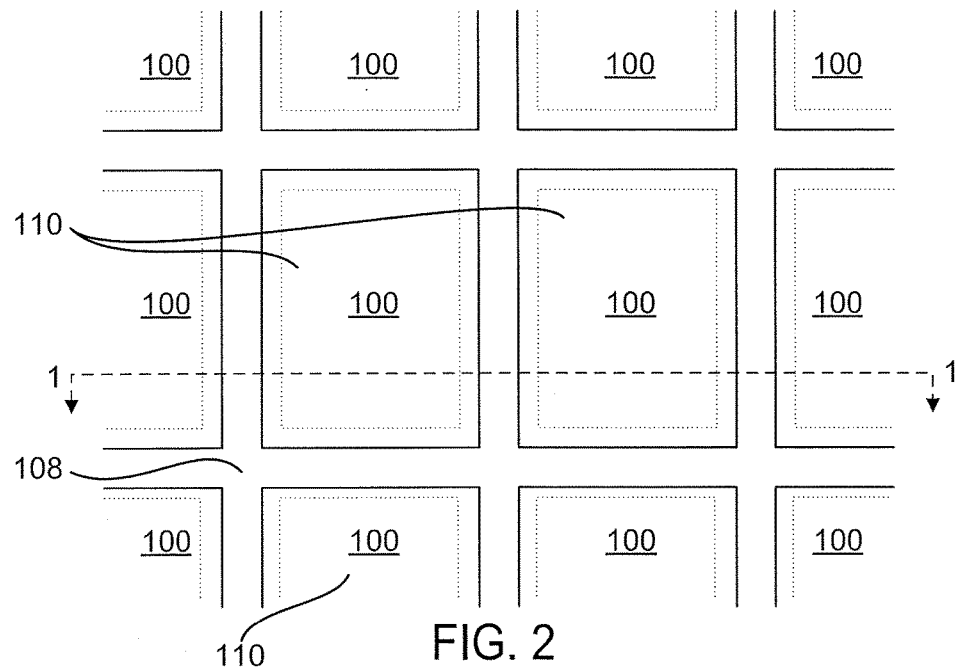
FIG. 2 illustrates a top view of the electrowetting pixels of FIGS. 1A and 1B mostly exposed by an electrowetting fluid, according to various embodiments.

FIG. 1A is a cross-section of a portion of a reflective electrowetting display device 10 illustrating several electrowetting pixels 100 taken along sectional line 1-1 of FIG. 2. FIG. 1B shows the same cross-sectional view as FIG. 1A in which an electric potential has been applied to one of the electrowetting pixels 100 causing displacement of a first fluid disposed therein, as described below. FIG. 2 shows a top view of electrowetting pixels 100 formed over a bottom support plate 104.

In FIGS. 1A and 1B, two complete electrowetting pixels 100 and two partial electrowetting pixels 100 are illustrated. An electrowetting display device may include any number (usually a very large number, such as thousands or millions)

of electrowetting pixels 100. An electrode layer 102 is formed on a bottom support plate 104.

In various embodiments, electrode layer 102 may be connected to any number of transistors, such as thin film transistors (TFTs) (not shown), that are switched to either select or deselect electrowetting pixels 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other suitable transparent or non-transparent materials, for example.

In some embodiments, a dielectric barrier layer 106 may at least partially separate electrode layer 102 from a hydrophobic layer 107, such as an amorphous fluoropolymer layer for example, also formed on bottom support plate 104. Such separation may, among other things, prevent electrolysis occurring through hydrophobic layer 107. Dielectric barrier layer 106 may be formed from various materials including organic/inorganic multilayer stacks or silicon dioxide ($SiO_2$) and polyimide layers. When constructed using a combination of $SiO_2$ and polyimide layers, in certain embodiments the $SiO_2$ layer may have a thickness of 200 nanometers and a dielectric constant of 3.9, while the polyimide layer may have a thickness of 105 nanometers and a dielectric constant of 2.9. In some embodiments, hydrophobic layer 107 is an amorphous fluoropolymer layer including any suitable fluoropolymer(s), such as AF1600, produced by DuPont, based in Wilmington, Del. Hydrophobic layer 107 may also include suitable materials that affect wettability of an adjacent material, for example.

Pixel walls 108 form a patterned electrowetting pixel grid on hydrophobic layer 107. Pixel walls 108 may comprise a photoresist material such as, for example, epoxy-based negative photoresist SU-8. The patterned electrowetting pixel grid comprises rows and columns that form an array of electrowetting pixels. For example, an electrowetting pixel may have a width and a length in a range of about 50 to 500 micrometers.

A first fluid 110, which may have a thickness (e.g., a depth) in a range of about 1 to 10 micrometers, for example, overlays hydrophobic layer 107. First fluid 110 is partitioned by pixel walls 108 of the patterned electrowetting pixel grid. A second fluid 114, such as an electrolyte solution, overlays first fluid 110 and pixel walls 108 of the patterned electrowetting pixel grid. In certain embodiments, second fluid 114 may be electrically conductive and/or polar. For example, second fluid 114 may be water or a water solution, or a salt solution such as a solution of potassium chloride in water or a mixture of water and ethyl alcohol. In certain embodiments, second fluid 114 is transparent, but may be colored or absorbing. First fluid 110 is electrically non-conductive and may for instance be an alkane like hexadecane or (silicone) oil. First fluid 110 is immiscible with second fluid 114. Herein, substances are immiscible with one another if the substances do not substantially form a solution.

A support plate 116 is positioned opposite bottom support plate 114. Support plate 116 covers second fluid 114 and one or more spacers 118 to maintain second fluid 114 over the electrowetting pixel array. In one embodiment, spacer 118 extends to support plate 116 and may rest upon a top surface of one of the pixel walls 108. In alternative embodiments, spacer 118 does not rest on pixel wall 108 but is substantially aligned with pixel wall 108. This arrangement may allow spacer 118 to come into contact with pixel wall 108 upon a sufficient pressure or force being applied to support plate 116. Multiple spacers 118 may be interspersed throughout the array of pixels 100. Support plate 116 may be made of glass or polymer and may be rigid or flexible, for example. In some embodiments, TFTs are fabricated onto support plate 116.

A voltage applied across, among other things, second fluid 114 and electrode layer 102 of individual electrowetting pixels may control transmittance or reflectance of the individual electrowetting pixels.

Reflective electrowetting display device 10 has a viewing side 120 through which an image formed by reflective electrowetting display device 10 may be viewed, and an opposing rear side 122. Support plate 116 faces viewing side 120 and bottom support plate 104 faces rear side 122. Reflective electrowetting display device 10 may be a segmented display type in which the image is built of segments. The segments may be switched simultaneously or separately. Each segment includes one electrowetting pixel 100 or a number of electrowetting pixels 100 that may be neighboring or distant from one another. Electrowetting pixels 100 included in one segment are switched simultaneously, for example. The electrowetting display device may also be an active matrix driven display type or a passive matrix driven display, for example.

Hydrophobic layer 107 is arranged on bottom support plate 104 to create an electrowetting surface area. The hydrophobic character of hydrophobic layer 107 causes first fluid 110 to adhere preferentially to hydrophobic layer 107 because first fluid 110 has a higher wettability with respect to the surface of hydrophobic layer 107 than second fluid 114 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 110 absorbs light within at least a portion of the optical spectrum. First fluid 110 may be transmissive for light within a portion of the optical spectrum, forming a color filter. For this purpose, the fluid may be colored by addition of pigment particles or dye, for example. Alternatively, first fluid 110 may be black (e.g., absorbing substantially all light within the optical spectrum) or reflecting. Hydrophobic layer 107 may be transparent or reflective. A reflective layer may reflect light within the entire visible spectrum, making the layer appear white, or reflect a portion of light within the visible spectrum, making the layer have a color.

If a voltage is applied across an electrowetting pixel 100, electrowetting pixel 100 will enter into an active state. Electrostatic forces will move second fluid 114 toward electrode layer 102 within the active pixel as hydrophobic layer 107 formed within the active electrowetting pixel 100 becomes hydrophilic, thereby displacing first fluid 110 from that area of hydrophobic layer 107 to pixel walls 108 surrounding the area of hydrophobic layer 17, to a droplet-like form. Such displacing action uncovers first fluid 110 from the surface of hydrophobic layer 107 of electrowetting pixel 100.

FIG. 1B shows one of electrowetting pixels 100 in an active state. With an electric potential applied to electrode layer 102 underneath the activated electrowetting pixel 100, second fluid 114 is attracted towards electrode layer 102 displacing first fluid 110 within the activated electrowetting pixel 100.

As second fluid 114 moves into the activated electrowetting pixel 100, first fluid 110 is displaced and moves towards a pixel wall 108 of the activated electrowetting pixel. In the example of FIG. 1B, first fluid 110 of electrowetting pixel 100a has formed a droplet as a result of an electric potential being applied to electrowetting pixel 100a. After activation, when the voltage across electrowetting pixel 100a is returned to an inactive signal level of zero or a value near to zero, electrowetting pixel 100a will return to an inactive state, where first fluid 110 flows back to cover hydrophobic layer 107. In this way, first fluid 110 forms an electrically controllable optical switch in each electrowetting pixel 100.

When electrowetting pixel 100a is activated and first fluid 110 has formed a droplet, light can enter the activated electrowetting pixel 100a and be reflected off the reflective hydrophobic surface 107 formed over a bottom of electrowetting pixel 100a. With first fluid 110 deflected, however, the activated electrowetting pixel 100a is not symmetrical as first fluid 110 has accumulated at one side of electrowetting pixel 100a. As such, light entering electrowetting pixel 100a over a first end of electrowetting pixel 100a towards which first fluid 110 has moved (e.g., light rays 124) that would otherwise have entered electrowetting pixel 100a and been reflected out are blocked by first fluid 110. In contrast, light entering electrowetting pixel 100a over a second end of electrowetting pixel 100a (e.g., light rays 126) is not prevented from entering electrowetting pixel 100a and being reflected out. This will increase the perceived brightness of electrowetting pixel 100a, thereby increasing overall image quality.

To mitigate these effects in which pixel reflectance is determined at least in part by the direction of light entering the activated pixel, the disclosed reflective electrowetting device is configured to measure or infer an angle at which ambient light is incident upon a surface of the display device and, thereby, enters each of the display device's pixels. Based upon that measurement or inference, a controller can optimize the electrowetting display to move the first fluid within the display device's individual pixels in a particular direction with respect to the incoming ambient light. The direction of first fluid movement can be selected to optimize the display device's reflectance.

Figure 3:
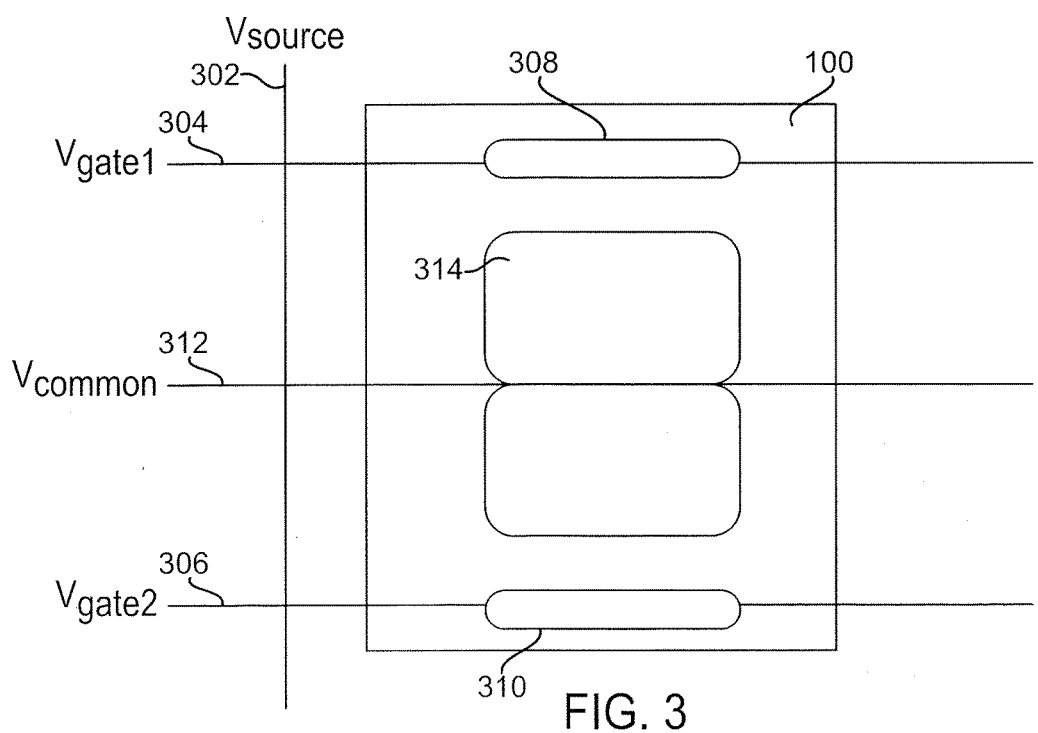
FIG. 3 depicts a top view of an example electrowetting pixel configuration including multiple activation transistors.

To enable the selectable first fluid movement direction, FIG. 3 depicts a top view of an electrowetting pixel configuration including multiple activation transistors. The devices are formed over a bottom surface of the pixel and enable control of a direction of movement of first fluid within the pixel when the pixel is activated.

As discussed above, an electrowetting display device may include an array of rows and columns of pixels. To control the state of each of those pixels, the display includes rows of gate lines and columns of source lines that are connected to transistors within each individual pixel. By applying a signal or voltage to a particular combination of gate lines and source lines, a controller operating within the display device can selectively control the state of a particular pixel.

In the pixel design shown in FIG. 3, pixel 100 includes a single source line 302 and two different gate lines 304 and 306 connected, respectively, to TFTs 308 and 310. TFTs 308 and 310 form two independent pixel electrodes for pixel 200. Common line 312 is connected to common electrode 314.

When pixel 100 is in its resting state, no signal is applied to either of gate lines 304 or 306. With no such signal applied, TFTs 308 and 310 of pixel 100 are not subjected to an electric potential with respect to common electrode 314 and, due to the electrowetting effects described above, first fluid 110 will be distributed throughout pixel 100 as shown in FIG. 2. This results in pixel 100 being closed and appearing black to a viewer.

When pixel 100 is to be activated, however, a controller within the electrowetting display device supplies a signal to source line 302 and one of gate lines 304 and 306 of pixel 100. When supplying these signals, the voltage supplied to the one of gate lines 304 and 306 is different from the voltage of common line 312 causing an electrical potential to be established between common electrode 314 and TFT 308 (if the voltage is applied to gate line 304) or TFT 310 (if the voltage is applied to gate line 306). As described above, this potential causes second fluid 114 to enter pixel 100 displacing first fluid 110 away from the TFT to which a signal has been supplied and opening or activating pixel 100. Accordingly, when activating pixel 100, the controller can apply a signal to either gate line 304 or gate line 306 to both activate pixel 100 and selectively control the direction of fluid movement within pixel 100 during activation.

Although FIG. 3 shows pixel 100 employing two separate transistor devices with connected gate lines, other embodiments of pixel 100 including three or more transistor devices and corresponding gate lines could be implemented to enable control of the first fluid movement in three or more directions. Such pixel designs could be implemented using non-square or rectangular pixel configurations. For example, a pixel having a triangular shape could include a separately-controlled TFT in each corner of the triangle shape, enabling selective movement of the first fluid towards any of the three corners of the triangle during pixel activation. Similarly, a pentagon-shaped pixel could include five different TFT devices disposed within each corner of the pentagon enabling five-way control of first fluid movement within the pixel.

FIGS. 4A and 4B are front and side views, respectively, of an example electrowetting display device 400 configured to optimize fluid movement within the display device's pixels based upon ambient light. Electrowetting display device 400 includes a frame 402 configured to support the various components of electrowetting display device 400. An array of electrowetting pixels 404 is mounted to frame 402. Array of electrowetting pixels 404 may include many thousands or millions of pixels. The individual pixels may be arranged in a row and column format or may be configured in any other suitable geometrical arrangement. A transparent top support plate 416 is mounted to frame 402.

A controller 406 is connected to array of pixels 404 and is configured to control the activation state of each pixel in the array. As described herein, controller 406 is configured to control a direction of fluid movement within the pixel when activating a particular pixel.

Electrowetting display device 400 also includes one or more suitable sensors, such as a suitable number of optical sensors 408a, 408b, 408c, and 408d. Optical sensors 408a-d can include a number of components, such as detectors (e.g., photodetector, photoresistors, photodiodes, charge-coupled devices, phototransistors, and the like) that are configured to detect an intensity of light and convert that intensity of light into a corresponding electrical signal. In other embodiments, one or more optical sensors 408a-d may be replaced by or include any suitable type of sensor or detector configured to detect an intensity of light, including bolometers, which convert light intensity into a temperature that can be read by a suitable temperature sensor, light-addressable potentiometric sensors, and the like. In the present disclosure, the intensity of light refers to a number of photons and/or an energy of photons entering a particular sensor over a given time period. In embodiments, any appropriate measurement of light intensity may be utilized including radiant intensity, luminous intensity, irradiance, brightness, luminance, and the like. Generally, optical sensors 408a-d are configured to detect light in the visible spectrum, though other types of optical sensors 408a-d configured to detect different wavelengths of light in addition to or separate from visible light may be utilized.

In the embodiment illustrated in FIGS. 4A and 4B, optical sensors 408a-d are each biased so as to primarily detect light originating from a particular direction with respect to electrowetting display device 400. The detection bias for each optical sensor 408a-d is indicated by the dashed lines originating from each sensor 408a-d in FIGS. 4A and 4B. The fields of vision (FOVs) for each optical sensor 408a-d may, in some embodiments, have the shape of a cone with the cone's narrowest portion originating at the optical sensor 408a-d. In one embodiment, the directional sensitivity of each sensor 408a-d can be controlled using a lens (e.g., a convergent lens, ball or spherical lens, collimation lens, and the like) mounted to sensors 408a-d and configured to provide the desired directional sensitivity.

In this manner, optical sensor 408a is biased to detect light originating from the top left of the device (as shown in FIG. 4A) and from above the device (as shown in FIG. 4B). Optical sensor 408b is biased to detect light originating from the top right of the device (as shown in FIG. 4A) and from above the device (as shown in FIG. 4B). Optical sensor 408c is biased to detect light originating from the bottom left of the device (as shown in FIG. 4A) and from above the device (as shown in FIG. 4B). Optical sensor 408d is biased to detect light originating from the bottom right of the device (as shown in FIG. 4A) and from above the device (as shown in FIG. 4B).

As shown in FIG. 4A, optical sensors 408a-d may be connected to support plate 416 and located separately from array of electrowetting pixels 404. In this manner, optical sensors 408a-d may represent components that are independent from array of electrowetting pixels 404. In other embodiments, however, one or more of optical sensors 408a-d could instead be incorporated into one or more of the pixels of array of electrowetting pixels 404. In such an embodiment, light detecting structures, such as photodiodes, charge-couple devices, and the like, could be fabricated within one or more pixels. The pixels may then operate to detect light rather than depict a portion of an image to be display on electrowetting display device 400. In some cases, multiple optical sensors 408a-d may be incorporated into a single housing. In that case, the housing could contain multiple optical sensors 308a-d each configured to detect light from a different direction.

Controller 406 is configured to receive data from each of optical sensors 408a-d. Based upon the received data, controller 406 can determine or infer an angle at which ambient light is incident upon the front surface 421 of electrowetting display device 400 and, thereby, the angle at which ambient light enters each of the pixels in the array of electrowetting pixels 404. Controller 406 can then control the first fluid movement within each pixel to provide improved reflectivity given that angle of incidence.

Even if optical sensors 408a-d are strictly biased to only detect light originating from a particular direction, in the majority of applications, at any given time, each one of optical sensors 408a, 408b, 408c, and 408d will detect some light. This is true even if only a single light source (such as a single overhead light or desk lamp) is illuminating electrowetting display device 400. In that case, light originating from the single light source is likely to disperse throughout the room or space in which electrowetting display device 400 is located and be reflected from a number of different surfaces, resulting in some light entering each of optical sensors 408a-d. This is also true in outdoor situations where many reflective surfaces would disperse any present light source such as street lights, building lights, or the sun.

Because each of optical sensors 408a-d are likely to generate an output indicating the detection of ambient light, controller 406 may be configured to compare or analyze the outputs of optical sensors 408a-d in order to make a determination as to the direction of a majority of ambient light with respect to electrowetting display device 400. For example, controller 406 may analyze the outputs of optical sensors 408a-d to determine which optical sensor 408a-d detected the strongest signal, indicating that the majority of ambient light is originating from a direction within the FOV of that optical sensor 408a-d.

For example, with reference to FIGS. 4A and 4B, each pixel in array of pixels 404 may be configured in accordance with pixel 100 of FIG. 3, thereby enabling two-direction control of first fluid movement within each pixel. In this example, the pixels are oriented so that the first fluid can be moved in either direction lengthwise along device (e.g., in the directions indicated by arrows 410).

Accordingly, with the pixels of array of pixels 404 so arranged, controller 406 may be configured to control first fluid movement within electrowetting display device 400 depending upon whether the majority of ambient light incident upon electrowetting display device 400 originates from a direction over first end 412 or second end 414 of electrowetting display device 400. For example, if the majority of ambient light incident upon front surface 421 of support plate 416 originates from the direction of first end 412 of electrowetting display device 400, controller 406 may, when activating one or more pixels of array 404 cause the first fluid in each activated pixel to move towards second end 414 of electrowetting display device 400. Conversely, if the majority of ambient light originates from the direction of second end 414 of electrowetting display device 400, controller 406 may, when activating one or more pixels of array 404 cause the first fluid in each activated pixel to move towards first end 412 of electrowetting display device 400.

In other words, if the angle formed by light incident upon front surface 421 of support plate 416 is acute with respect to first end 412 of electrowetting display device 400, controller 406 will cause the first fluid in an activated pixel to move towards second end 414. This example is illustrated in FIG. 4B, where the angle formed by ambient light 418 forms an acute angle θ with respect to first end 412. Specifically, the angle θ between the vector of ambient light 418 and line 419 is less than 90 degrees. Line 419 is formed by drawing a line from the point at which ambient light 418 is incident upon front surface 421 towards an end 412 or 414 of electrowetting display device 400 (in this example, the first end 412). Line 419 is drawn to form a right angle with the border of first end 412. Conversely, if the angle formed by light incident upon front surface 421 of support plate 416 is acute with respect to second end 414 of electrowetting display device 400, controller 406 will cause the first fluid in an activated pixel to move towards first end 412.

Figure 5A:
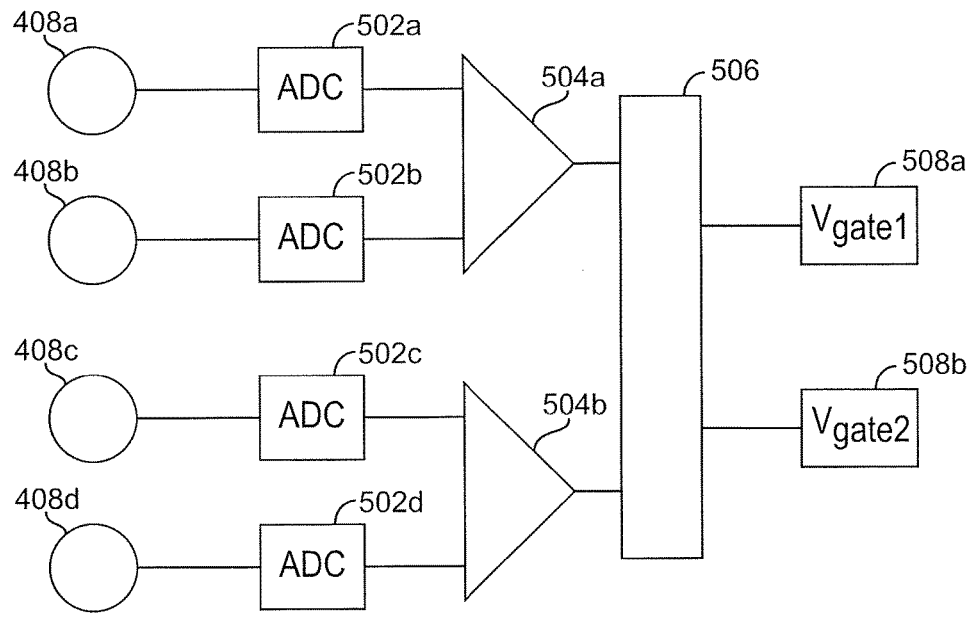
FIG. 5A shows an example circuit configured to compare the outputs of a number of optical sensors to determine from which end of a device a majority of ambient light is originating.

In this arrangement, the outputs of optical sensors 408a and 408b at first end 412 of electrowetting display device 400 can be compared to the outputs of optical sensors 408c and 408*d* to determine from which end of electrowetting display device 400 the majority of ambient light is originating. FIG. 5A shows an example circuit configured to compare the outputs of optical sensors 408*a-d* to determine from which end of electrowetting display device 400 a majority of ambient light is originating. The circuit can then generate an output indicating which gate line should be utilized by controller 406 when activating a pixel.

Referring to FIG. 5A, the outputs of optical sensors 408*a-d* are first converted to digital values by ADC converters 502*a-d*, respectively. Then, the converted outputs of optical sensors 408*a* and 408*b* are summed together by adder 504*a*. The output of adder 504*a*, therefore, is a value indicative of an intensity of ambient light detected by optical sensors 408*a* and 408*b* that, due to the orientation of the FOVs of optical sensors 408*a* and 408*b* indicates an intensity of ambient light originating at first end 412 of electrowetting display device 400. Similarly, the converted outputs of optical sensors 408*c* and 408*d* are summed together by adder 504*b*. The output of adder 504*b*, therefore, is a value indicative of an intensity of ambient light detected by optical sensors 408*c* and 408*d* that, due to the orientation of the FOVs of optical sensors 408*c* and 408*d* indicates an intensity of ambient light originating at second end 414 of electrowetting display device 400.

The outputs of adders 504*a-b* are supplied to processor 506, which compares the values received from adders 504*a-b* and, based upon a result of that comparison, generates an output signal 508 indicative of whether adder 504*a* or 504*b* had a greater output. In other embodiments, adders 504*a-b* may instead be configured to determine an average value or their respective inputs, rather than sum the inputs together.

Accordingly, signal 508 indicates from which end of electrowetting display device 400 a majority of ambient light is originating. For example, if the output of added 504*a* is greater than the output of adder 504*b* (indicating that a majority of ambient originates from first end 412 of electrowetting display device 400), the signal outputted by processor 506 could be supplied to controller 406, which would cause first fluid movement in any activated pixel in electrowetting display device 400 towards second end 414 of electrowetting display device 400.

Figure 5B:
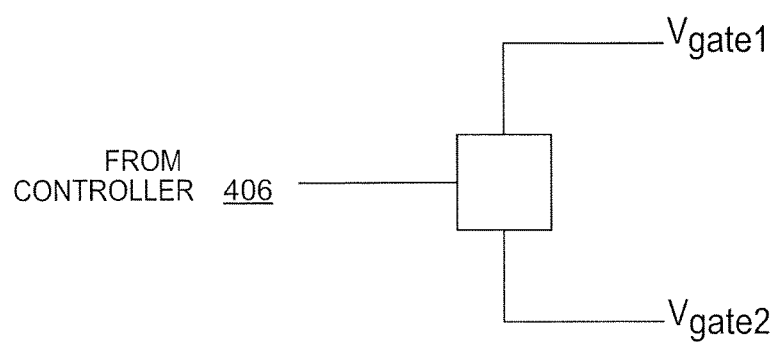
FIG. 5B shows an example pixel gate driver circuit configured to control fluid movement within a pixel.

Alternatively, the signal could be supplied to control a switch that controls which gate terminal in a pixel will be activated when controller 406 attempts to activate the pixel, which, in turn, controls the direction of first fluid movement within the pixel. For example, FIG. 5B shows a circuit including switch 510 that receives as input a pixel activation signal from controller 406. Switch 510 also receives as an input the output signal 508 of processor 506. Switch 510 then uses output signal 508, to determine from which end of electrowetting display device 400 a majority of ambient light is originating, and to route the activation signal to one of the gate lines within the pixel (indicated by the outputs $V_{gate1}$ and $V_{gate2}$) In this manner the direction of movement within an activated pixel can be controlled.

Referring back to FIG. 5A, in some embodiments, if the outputs of adders 504*a* and 504*b* are equal (or within a threshold value such as 5% or 10%), that may indicate that ambient light is incident upon the front surface of electrowetting display device 400 nearly perpendicularly to the front surface. In that case, controller 406 may be configured to dither the fluid movement within the pixels of electrowetting display device 400, for example, by causing fluid movement in different rows of pixels in opposite directions for pixels being activated.

In various embodiments of the present disclosure, electrowetting display devices may be configured with any number and/or arrangement of optical sensors to analyze the direction of ambient light incident upon a surface of the display device. To illustrate, FIGS. 6A-6D illustrate a number of different optical sensor configurations that may be utilized in accordance with the present disclosure.

Figure 6A:
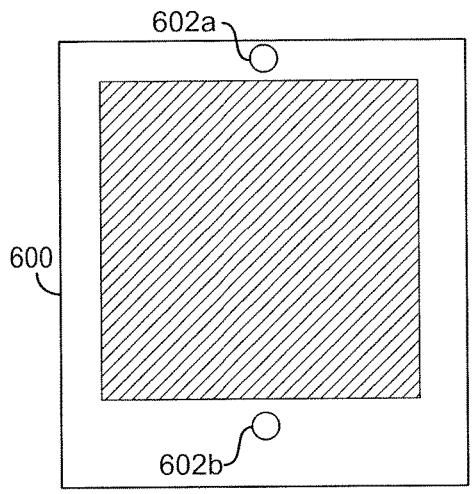
FIGS. 6A-6D illustrate a number of different optical sensor configurations that may be utilized in accordance with the present disclosure.

FIG. 6A illustrates a device 600 including two optical sensors. Optical sensor 602*a* may be biased to detect light originating from a first direction with respect to device 600, while optical sensor 602*b* may be biased to detect light originating from a second direction. A controller (not shown) within device 600 can then be configured to compare the outputs generated by optical sensors 602*a* and 602*b* and control first fluid movement within the electrowetting pixels of device 600 based upon the signals received from optical sensors 602*a-b*.

Figure 6B:
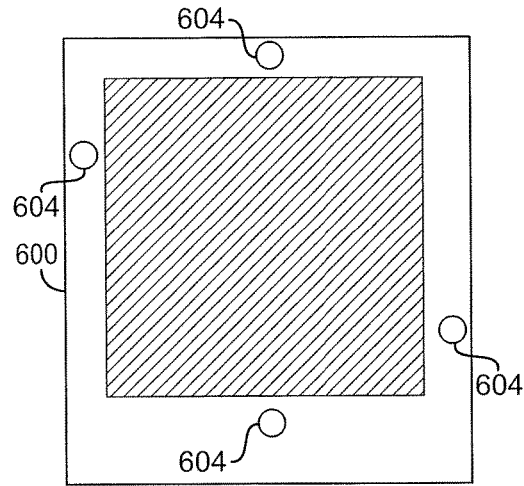

FIG. 6B shows an alternative embodiment of device 600 including four optical sensors 604. Each optical sensor 604 may be configured to detect ambient light originating from a different direction with respect to device 600. In other embodiments, one or more of optical sensors 604 may be configured to detect ambient light originating from the same direction (e.g., to provide redundancy). In the example depicted in FIG. 6B, the positioning of optical sensors 604 is not symmetrical about an axis taken through the length of device 600 (i.e., from the top to the bottom of device 600 in FIG. 6B). This non-symmetrical arrangement of optical sensors 604 may be useful to minimize the likelihood of one or more of optical sensors 604 being blocked by a user's hands as the user holds device 600.

Figure 6C:
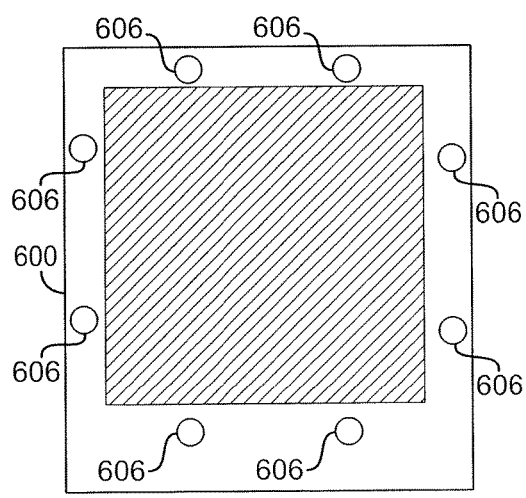
Figure 6D:
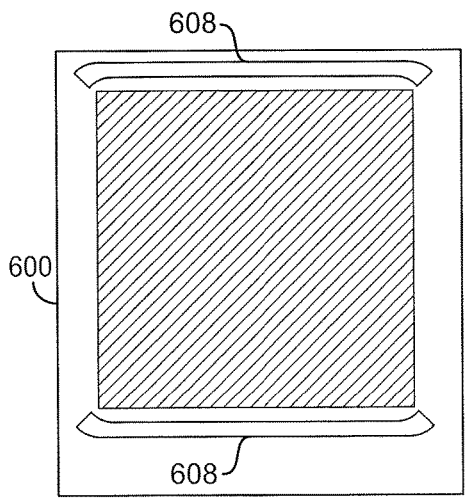

In FIG. 6C an example device 600 is depicted that includes eight different optical sensors 606. As discussed above, any number of optical sensors may be utilized within an electrowetting display device configured in accordance with the present disclosure. Each of the optical sensors 606 may detect ambient light originating from different directions, or some of optical sensors 606 may detect light originating from the same direction. In another embodiment shown in FIG. 6D, one or more optical sensors 608 may be configured as elongated sensors wrapped around a portion of device 600.

Any suitable mechanism or device may be utilized in conjunction with the present disclosure to bias the sensitivity of the optical sensors to enable directional measurement of ambient light with respect to the electrowetting display device. For example, FIGS. 7A-7F show top and side views of alternative designs for providing the directional sensitivity of an optical sensor.

Figure 7A:
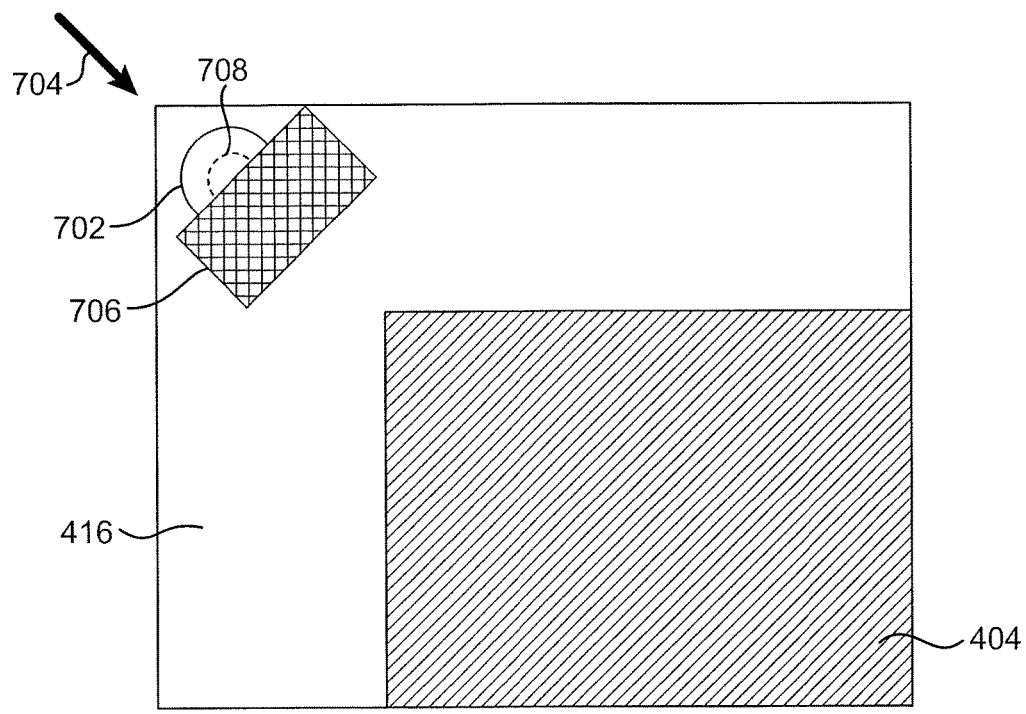
FIGS. 7A-7F show top and side views of alternative designs for optical sensors having directional sensitivity.
Figure 7B:
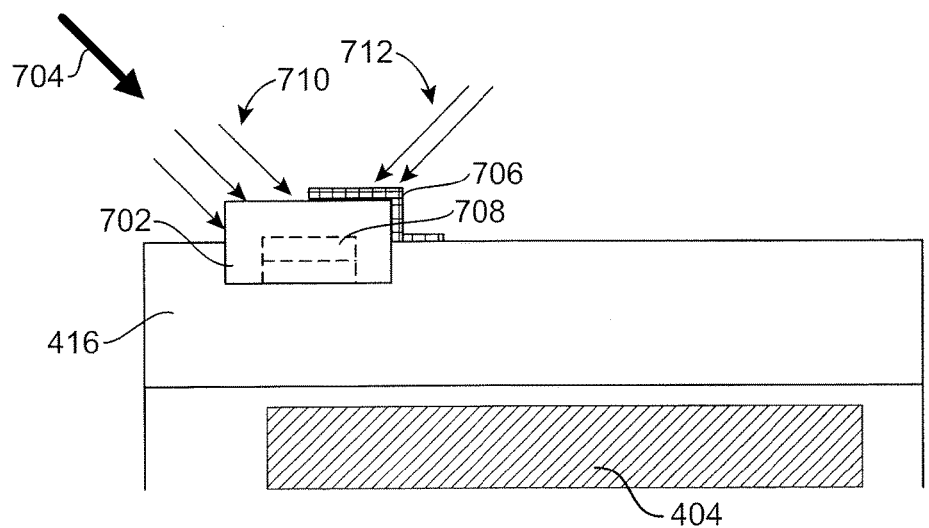

FIGS. 7A and 7B show enlarged portions of an electrowetting display device including areas similar to those indicated by dashed box 700 on FIG. 4A and dashed box 701 on FIG. 4B.

In FIGS. 7A and 7B, optical sensor 702 is biased to detect light originating from the direction of arrow 704. Optical sensor 702 includes light detector 708, which may include a photodiode, charge-coupled device, phototransistors, or any other device configured to detect photons or an intensity of light. In a default configuration, light detector 708 may detect light entering optical sensor 702 from many directions. As such, a black or light-absorbing mask 706 is formed over and/or around a portion of optical sensor 702 to prevent light from entering optical sensor 702 from a direction other than that indicated generally by arrow 704. For example, with reference to FIG. 7B, light rays 710 can enter optical sensor 702 and will be detected by light detector 708, whereas light rays 712 will be absorbed or blocked by mask 706. Mask 706 may be formed using any suitable fabrication process, such as a photomask/photolithography fabrication process. Alternatively, mask 706 may include a light-absorbing material that is adhered to a surface proximate or over a portion of optical sensor 702 to provide the desired directional sensitivity. In some cases, mask 706 may include a light-absorbing (e.g., black) ink printed over a surface proximate optical sensor 702. In alternative embodiments, mask 706 may instead be reflective so that ambient light traveling towards optical sensor 702 is reflected away from optical sensor 702 by mask 706 rather than being absorbed by mask 706.

Figure 7C:
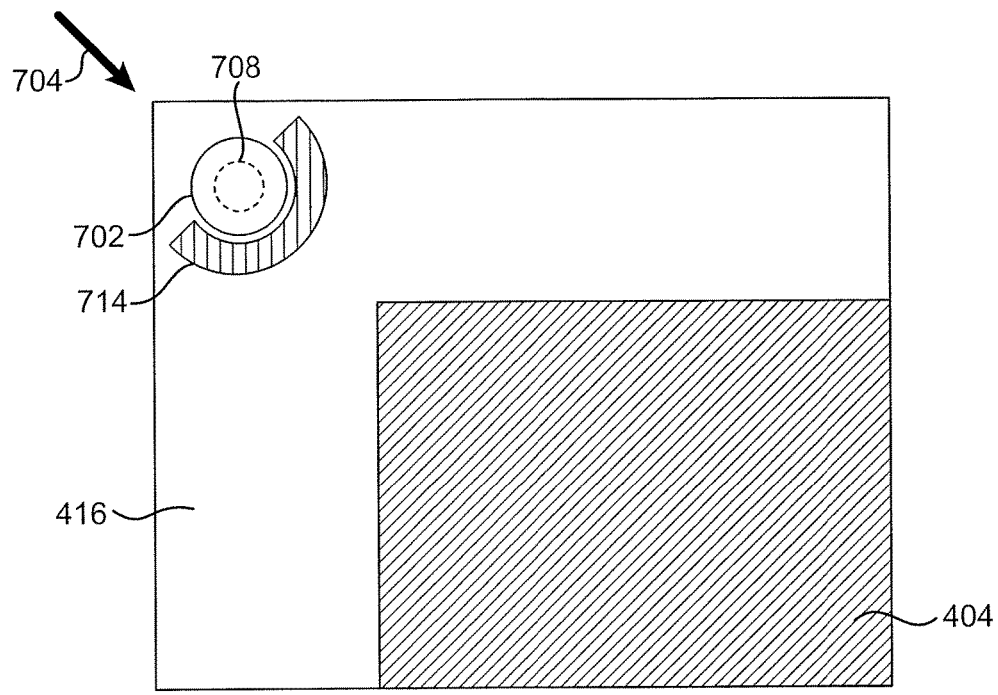
Figure 7D:
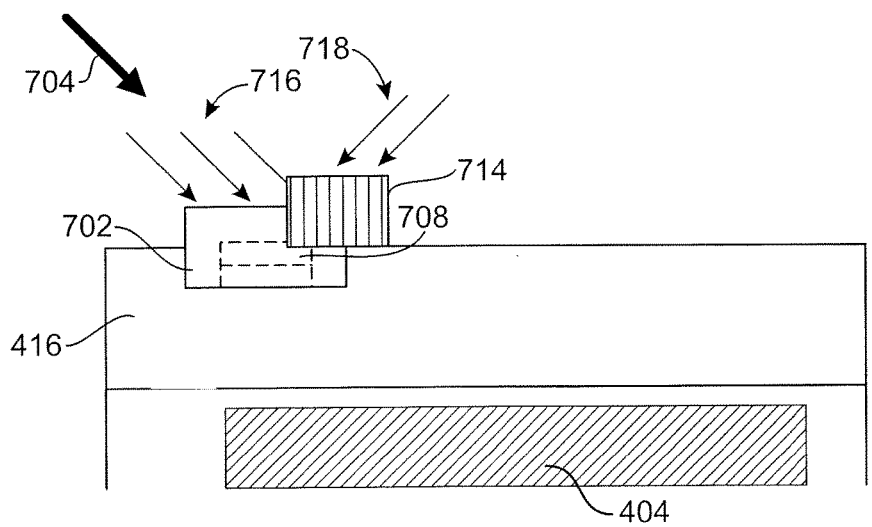

In other embodiments, as illustrated in FIGS. 7C and 7D, a physical barrier, such as raised wall 714 could be constructed about at least a portion of optical sensor 702 to prevent light entering optical sensor 702 and being detected by light detector 708 from a direction other than that of arrow 704. Wall 714 can be constructed using any suitable light-blocking material and may be fabricated using any suitable fabrication technique. Wall 708 may be formed integrally as part of top support plate 416 or may be a separate structure that is attached (e.g., via adhesive, fixtures, or another connecting device) to top support plate 416. As shown in FIG. 7D, light rays 716 can enter optical sensor 702 and will be detected by light detector 708, whereas light rays 718 will be absorbed or blocked by wall 714.

Figure 7E:
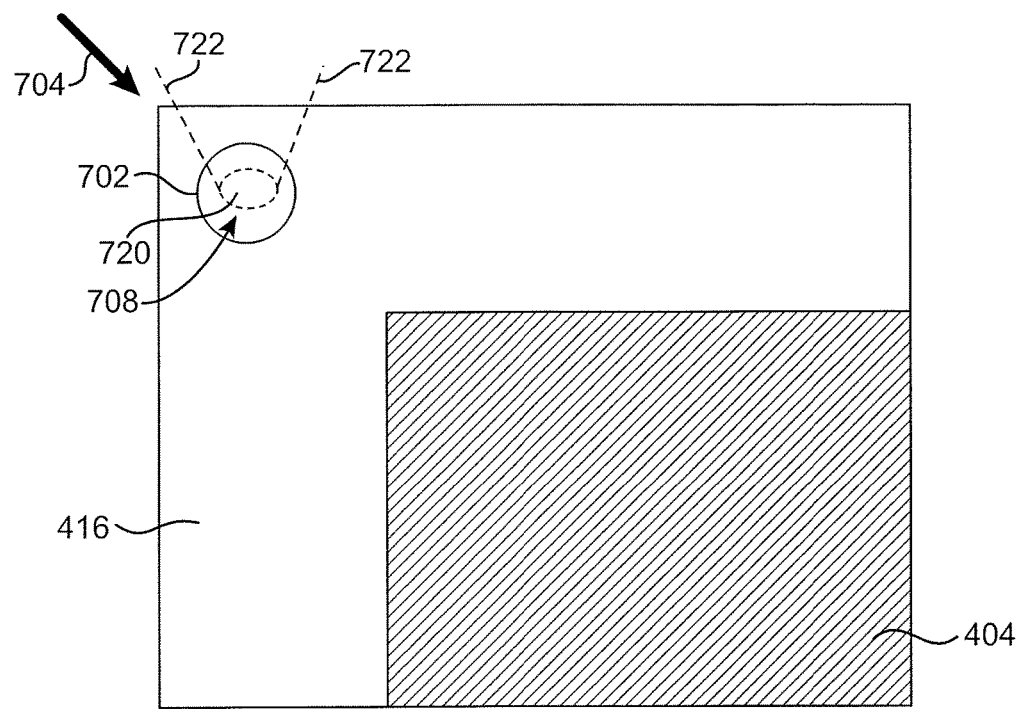
Figure 7F:
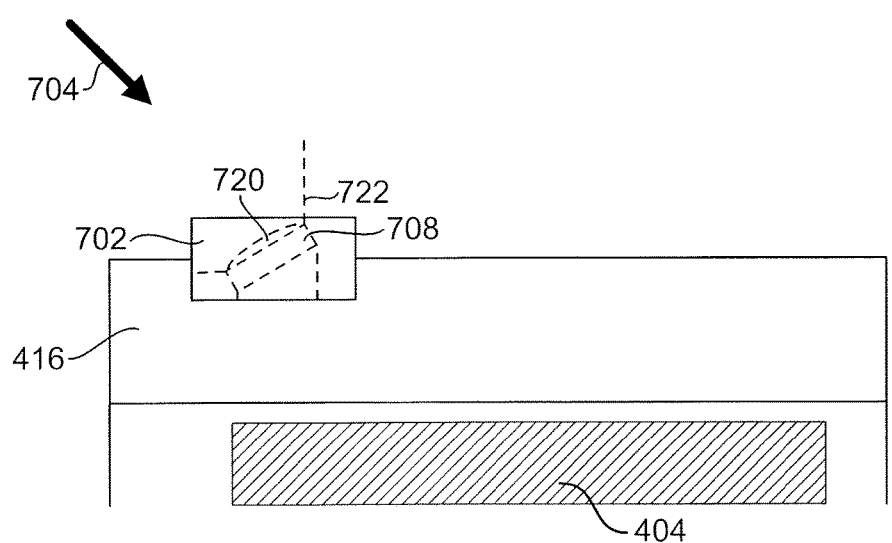

In other embodiments, as illustrated in FIGS. 7E and 7F, optical sensor 702 may be biased to detect light originating from the direction of arrow 704 to tilting or orienting light detector 708 towards the direction of arrow 704. In this example, light detector 708 may only be configured to detect light originating from a particular direction, as indicated by dashed lines 722, defining a FOV for light detector 708. By tilting or orienting light detector 708 as illustrated, the FOV can be oriented or positioned so that light detector 708 will detect light originating from the direction of arrow 704, but not light originating from directions outside the FOV of light detector 708. In some embodiments, to control the size of the FOV of light detector 708 lens 720, such as a convergent lens, ball or spherical lens, or collimation lens, may be positioned over light detector 708 to control (e.g., limit or increase) the FOV of light detector 708.

In various embodiments of electrowetting display devices including a plurality of optical sensors, one or more of the optical sensors may include structure such as mask 706 and/or wall 708 to provide or enhance the desired light detection directionality. In yet other embodiments, to provide the desired directionality bias of the optical sensors, the optical sensors could be mounted directly into an edge of the electrowetting display device.

Figure 8:
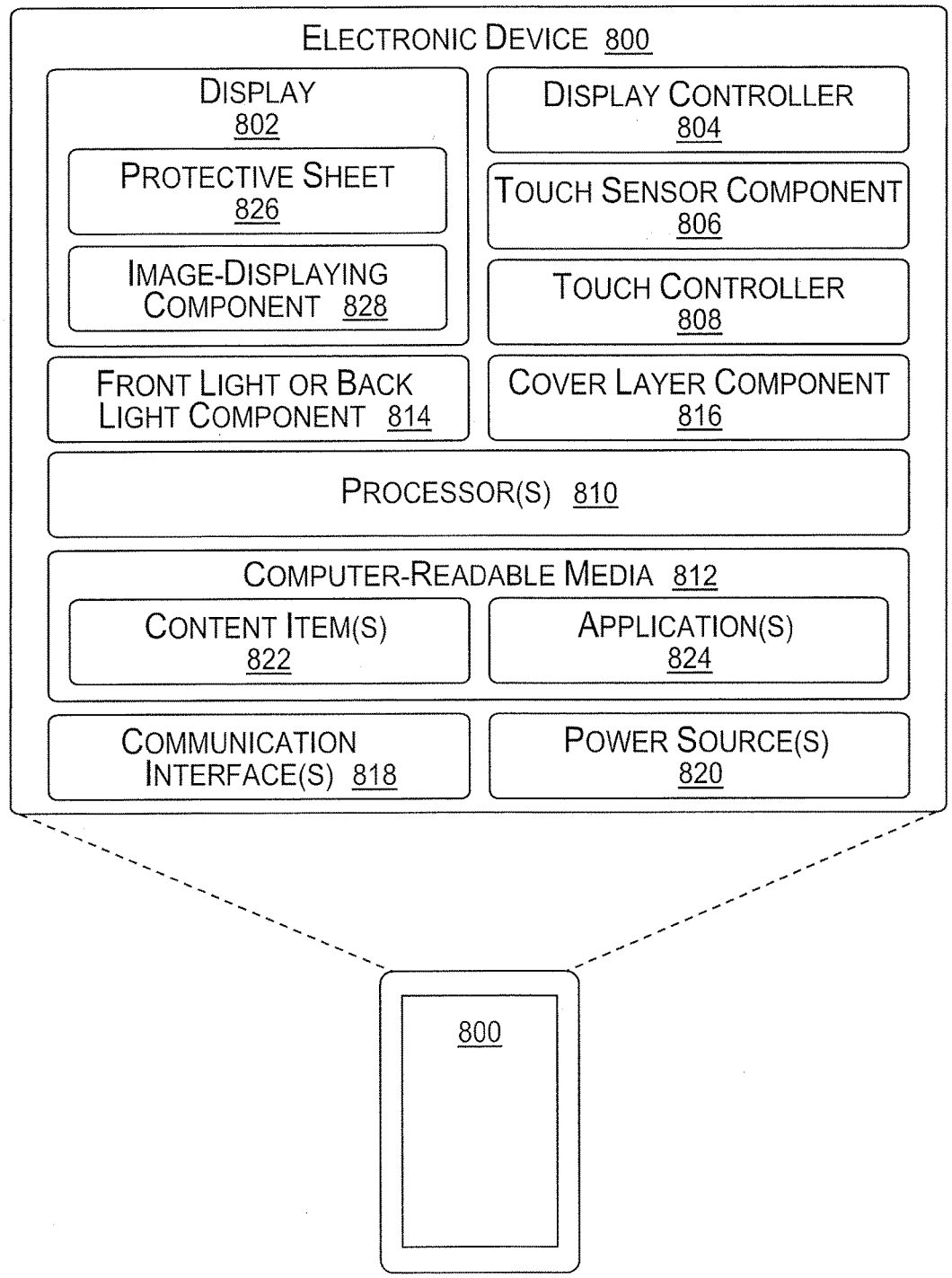
FIG. 8 illustrates an example electronic device that may incorporate a display device, according to various embodiments.

FIG. 8 illustrates an example electronic device 800 that may incorporate any of the display devices discussed above. Electronic device 800 may comprise any type of electronic device having a display. For instance, electronic device 800 may be a mobile electronic device (e.g., an electronic book reader, a tablet computing device, a laptop computer, a smart phone or other multifunction communication device, a portable digital assistant, a wearable computing device, or an automotive display). Alternatively, electronic device 800 may be a non-mobile electronic device (e.g., a computer display or a television). In addition, while FIG. 8 illustrates several example components of electronic device 800, it is to be appreciated that electronic device 800 may also include other conventional components, such as an operating system, system busses, input/output components, and the like. Further, in other embodiments, such as in the case of a television or computer monitor, electronic device 800 may only include a subset of the components illustrated.

Regardless of the specific implementation of electronic device 800, electronic device 800 includes a display 802 and a corresponding display controller 804. Display 802 may represent a reflective or transmissive display in some instances or, alternatively, a transflective display (partially transmissive and partially reflective).

In one embodiment, display 802 comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 802 are independently activated, display 802 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 802 may represent a backlit display, examples of which are mentioned above.

In addition to including display 802, FIG. 8 illustrates that some examples of electronic device 800 may include a touch sensor component 806 and a touch controller 808. In some instances, at least one touch sensor component 806 resides with, or is stacked on, display 802 to form a touch-sensitive display. Thus, display 802 may be capable of both accepting user touch input and rendering content in response to or corresponding to the touch input. As several examples, touch sensor component 806 may comprise a capacitive touch sensor, a force sensitive resistance (FSR), an interpolating force sensitive resistance (IFSR) sensor, or any other type of touch sensor. In some instances, touch sensor component 806 is capable of detecting touches as well as determining an amount of pressure or force of these touches.

FIG. 8 further illustrates that electronic device 800 may include one or more processors 810 and one or more computer-readable media 812, as well as a front light component 814 (which may alternatively be a backlight component in the case of a backlit display) for lighting display 802, a cover layer component 816, such as a cover glass or cover sheet, one or more communication interfaces 818 and one or more power sources 820. The communication interfaces 818 may support both wired and wireless connection to various networks, such as cellular networks, radio, WiFi networks, short range networks (e.g., Bluetooth®), and infrared (IR) networks, for example.

Depending on the configuration of electronic device 800, computer-readable media 812 (and other computer-readable media described throughout) is an example of computer storage media and may include volatile and nonvolatile memory. Thus, computer-readable media 812 may include, without limitation, RAM, ROM, EEPROM, flash memory, and/or other memory technology, and/or any other suitable medium that may be used to store computer-readable instructions, programs, applications, media items, and/or data which may be accessed by electronic device 800.

Computer-readable media 812 may be used to store any number of functional components that are executable on processor 810, as well as content items 822 and applications 824. Thus, computer-readable media 812 may include an operating system and a storage database to store one or more content items 822, such as eBooks, audio books, songs, videos, still images, and the like. Computer-readable media 812 of electronic device 800 may also store one or more content presentation applications to render content items on electronic device 800. These content presentation applications may be implemented as various applications 824 depending upon content items 822. For instance, the content presentation application may be an electronic book reader application for rending textual electronic books, an audio player for playing audio books or songs, or a video player for playing video.

In some instances, electronic device 800 may couple to a cover (not illustrated in FIG. 8) to protect the display 802 (and other components in the display stack or display assembly) of electronic device 800. In one example, the cover may include a back flap that covers a back portion of electronic device 800 and a front flap that covers display 802 and the other components in the stack. Electronic device 800 and/or the cover may include a sensor (e.g., a Hall effect sensor) to detect whether the cover is open (i.e., if the front flap is not atop display 802 and other components). The sensor may send a signal to front light component 814 if the cover is open and, in response, front light component 814 may illuminate display 802. If the cover is closed, meanwhile, front light component 814 may receive a signal indicating that the cover has closed and, in response, front light component 814 may turn off.

Furthermore, the amount of light emitted by front light component 814 may vary. For instance, upon a user opening the cover, the light from the front light may gradually increase to its full illumination. In some instances, electronic device 800 includes an ambient light sensor (not illustrated in FIG. 8) and the amount of illumination of front light component 814 may be based at least in part on the amount of ambient light detected by the ambient light sensor. For example, front light component 814 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 802 may vary depending on whether front light component 814 is on or off, or based on the amount of light provided by front light component 814. For instance, electronic device 800 may implement a larger default font or a greater contrast when the light is off compared to when the light is on. In some embodiments, electronic device 800 maintains, if the light is on, a contrast ratio for display 802 that is within a certain defined percentage of the contrast ratio if the light is off.

As described above, touch sensor component 806 may comprise a capacitive touch sensor that resides atop display 802. In some examples, touch sensor component 806 may be formed on or integrated with cover layer component 816. In other examples, touch sensor component 806 may be a separate component in the stack of the display assembly. Front light component 814 may reside atop or below touch sensor component 806. In some instances, either touch sensor component 806 or front light component 814 is coupled to a top surface of a protective sheet 826 of display 802. As one example, front light component 814 may include a lightguide sheet and a light source (not illustrated in FIG. 8). The lightguide sheet may comprise a substrate (e.g., a transparent thermoplastic such as PMMA or other acrylic), a layer of lacquer and multiple grating elements formed in the layer of lacquer that function to propagate light from the light source towards display 802; thus, illuminating display 802.

Cover layer component 816 may include a transparent substrate or sheet having an outer layer that functions to reduce at least one of glare or reflection of ambient light incident on electronic device 800. In some instances, cover layer component 816 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, protective sheet 826 may include a similar UV-cured hard coating on the outer surface. Cover layer component 816 may couple to another component or to protective sheet 826 of display 802. Cover layer component 816 may, in some instances, also include a UV filter, a UV-absorbing dye, or the like, for protecting components lower in the stack from UV light incident on electronic device 800. In still other examples, cover layer component 816 may include a sheet of high-strength glass having an antiglare and/or antireflective coating.

Display 802 includes protective sheet 826 overlying an image-displaying component 828. For example, display 802 may be preassembled to have protective sheet 826 as an outer surface on the upper or image-viewing side of display 802. Accordingly, protective sheet 826 may be integral with and may overlay image-displaying component 828. Protective sheet 826 may be optically transparent to enable a user to view, through protective sheet 826, an image presented on image-displaying component 828 of display 802.

In some examples, protective sheet 826 may be a transparent polymer film in the range of 25 to 200 micrometers in thickness. As several examples, protective sheet 826 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 826 may include a coating, such as the hard coating described above. For instance, the hard coating may be applied to the outer surface of protective sheet 826 before or after assembly of protective sheet 826 with image-displaying component 828 of display 802. In some examples, the hard coating may include a photoinitiator or other reactive species in its composition, such as for curing the hard coating on protective sheet 826. Furthermore, in some examples, protective sheet 826 may be dyed with a UV-light-absorbing dye, or may be treated with other UV-absorbing treatment. For example, protective sheet 826 may be treated to have a specified UV cutoff such that UV light below a cutoff or threshold wavelength is at least partially absorbed by protective sheet 826, thereby protecting image-displaying component 828 from UV light.

According to some embodiments herein, one or more of the components discussed above may be coupled to display 802 using fluid optically-clear adhesive (LOCA). For example, the light guide portion of front light component 814 may be coupled to display 802 by placing LOCA on the outer or upper surface of protective sheet 826. If the LOCA reaches the corner(s) and/or at least a portion of the perimeter of protective sheet 826, UV-curing may be performed on the LOCA at the corners and/or the portion of the perimeter. Thereafter, the remaining LOCA may be UV-cured and front light component 814 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 814. In other embodiments, the LOCA may be placed near a center of protective sheet 826, and pressed outwards towards a perimeter of the top surface of protective sheet 826 by placing front light component 814 on top of the LOCA. The LOCA may then be cured by directing UV light through front light component 814. As discussed above, and as discussed additionally below, various techniques, such as surface treatment of the protective sheet, may be used to prevent discoloration of the LOCA and/or protective sheet 826.

While FIG. 8 illustrates a few example components, electronic device 800 may have additional features or functionality. For example, electronic device 800 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 800 may reside remotely from electronic device 800 in some implementations. In these implementations, electronic device 800 may utilize communication interfaces 818 to communicate with and utilize this functionality.

In one embodiment, an electrowetting display device includes a first support plate and a second support plate opposite the first support plate. The first support plate has rows and columns of pixel walls associated with a plurality of electrowetting pixels. A first fluid and a second fluid that is immiscible with the first fluid are arranged between the first support plate and the second support plate. A first pixel electrode is disposed on the first support plate for applying a first voltage within a first electrowetting pixel of the plurality of electrowetting pixels to cause displacement of the first fluid in a first direction within the first electrowetting pixel. A second pixel electrode is disposed on the first support plate for applying a second voltage within the first electrowetting pixel to cause displacement of the first fluid in a second direction within the first electrowetting pixel. A first sensor is connected to the second support plate and configured to detect a first intensity of light from a third direction. A second sensor is connected to the second support plate and configured to detect a second intensity of light from a fourth direction. A control circuit is configured to activate either the first pixel electrode or the second pixel electrode based upon a comparison of the first intensity of light to the second intensity of light.

In one embodiment, an electrowetting display device includes a first support plate and a second support plate. The first support plate has rows and columns of pixel walls associated with individual electrowetting pixels. A first fluid and a second fluid that is immiscible with the first fluid are arranged between the first support plate and the second support plate. A sensor is coupled to the second support plate and configured to detect a first intensity of light incident upon the second support plate. A controller is configured to displace the first fluid in either a first direction or a second direction based at least in part upon the first intensity of light detected by the sensor.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
   a first support plate and a second support plate opposite the first support plate, the first support plate having rows and columns of pixel walls associated with a plurality of electrowetting pixels;
   a first fluid and a second fluid that is immiscible with the first fluid, the first fluid and the second fluid between the first support plate and the second support plate;
   a first pixel electrode on the first support plate for application of a first voltage within a first electrowetting pixel of the plurality of electrowetting pixels to cause movement of the first fluid in a first direction within the first electrowetting pixel towards a second end of the first electrowetting pixel;
   a second pixel electrode on the first support plate for application of a second voltage within the first electrowetting pixel to cause movement of the first fluid in a second direction within the first electrowetting pixel towards a first end of the first electrowetting pixel that is opposite the second end of the first electrowetting pixel;
   a first sensor connected to the second support plate and positioned at the first end of the first electrowetting pixel, the first sensor configured to detect a first intensity of light upon the second support plate;
   a second sensor connected to the second support plate and positioned at the second end of the first electrowetting pixel, the second sensor configured to detect a second intensity of light upon the second support plate; and
   a control circuit configured to:
      compare the first intensity of light to the second intensity of light;
      i) determine a majority of light is incident upon the second support plate at an acute angle originating from a third direction corresponding to the first end of the second support plate based on the first intensity of light detected to be greater than the second intensity of light; and
      move the first fluid in the first direction towards the second end of the first electrowetting pixel by application of the first voltage within the first electrowetting pixel, using the first pixel electrode, and based on determining the majority of light is incident upon the second support plate at the acute angle originating from the third direction; and
      ii) determine a majority of light is incident upon the second support plate at an acute angle originating from a fourth direction corresponding to the second end of the second support plate based on the second intensity of light detected to be greater than the first intensity of light; and
      move the first fluid in the second direction, opposite the first direction, towards the first end of the first electrowetting pixel, by application of the second voltage within the first electrowetting pixel, using the second pixel electrode, and based on determining the majority of light is incident upon the second support plate at the acute angle originating from the fourth direction.

2. The electrowetting display device of claim 1, wherein the first sensor comprises a light detector oriented within the first sensor to detect light from the third direction.

3. The electrowetting display device of claim 1, wherein the first sensor comprises a light detector further comprising at least one of a photodiode, a bolometer, a charge-coupled device, a photoresistor, or a phototransistor.

4. The electrowetting display device of claim 3, further comprising a lens over the light detector to determine a field of vision of the light detector.

5. The electrowetting display device of claim 1, wherein the first direction is along a plane through the plurality of electrowetting pixels towards the second end of the first electrowetting pixel and the second direction is along the plane towards the first end of the first electrowetting pixel.

6. The electrowetting display device of claim 1, further comprising a third sensor connected to the second support plate, the third sensor configured to detect a third intensity of light from a fifth direction and wherein the control circuit is configured to activate either the first pixel electrode or the second pixel electrode based upon a comparison of a sum of the first intensity and the third intensity to the second intensity.

7. The electrowetting display device of claim 1, further comprising a film over the second support plate proximate the first sensor, the film configured to reduce an amount of light entering the first sensor from the fourth direction.

8. The electrowetting display device of claim 1, further comprising a wall over the second support plate, the wall configured to block light from entering the first sensor from the fourth direction.

9. The electrowetting display device of claim 1, wherein the first sensor is located within a second electrowetting pixel of the plurality of electrowetting pixels and the second sensor is located within a third electrowetting pixel of the plurality of electrowetting pixels.

10. An electrowetting display device, comprising:
   a first support plate and a second support plate, the first support plate having rows and columns of pixel walls associated with individual electrowetting pixels;
   a first fluid and a second fluid that is immiscible with the first fluid, the first fluid and the second fluid between the first support plate and the second support plate;
   a set of sensors coupled to the second support plate, wherein the set of sensors comprises two or more sensors, and wherein the set of sensors are configured to:
   detect a first intensity of light incident upon the second support plate; and
   detect a second intensity of light upon the second support plate; and
   a controller configured to:
      compare the first intensity of light to the second intensity of light;
      i) determine a majority of light is incident upon the second support plate at an acute angle originating from a first direction corresponding to a first end of the second support plate based on the first intensity of light detected to be greater than the second intensity of light; and
      displace the first fluid towards a second end of the second support plate, by application of a first voltage using a first pixel electrode, and based on determining the majority of light is incident upon the second support plate at the acute angle originating from the first direction; and
      ii) determine a majority of light is incident upon the second support plate at an acute angle originating from a second direction corresponding to the second end of the second support plate based on the second intensity of light detected to be greater than the first intensity of light; and displace the first fluid towards the first end of the second support plate, opposite the second end of the second support plate, by application of a second voltage using a second pixel electrode, and based on determining the majority of light is incident upon the second support plate at the acute angle originating from the second direction.

11. The electrowetting display device of claim 10, wherein the set of sensors comprises a first sensor configured to detect light from the first direction and a second sensor configured to detect light from the second direction.

12. The electrowetting display device of claim 10, further comprising a third sensor connected to the second support plate, the third sensor configured to detect a third intensity of light and wherein the controller is configured to displace the first fluid in either the first direction or the second direction based upon a comparison of a sum of the first intensity and the third intensity to the second intensity.

13. The electrowetting display device of claim 10, wherein the first direction is along a plane through the electrowetting pixels towards a first end of the electrowetting display device and the second direction is along the plane towards a second end of the electrowetting display device.

14. The electrowetting display device of claim 10, wherein at least one sensor of the set of sensors is located within one of the electrowetting pixels.

15. The electrowetting display device of claim 10, wherein at least one sensor of the set of sensors comprises a detector oriented to detect light from the first direction and a lens over the light detector to determine a field of vision of the light detector.

16. The electrowetting display device of claim 10, further comprising a film over the second support plate proximate at least one sensor of the set of sensors, the film configured to reduce an amount of light entering the sensor.

17. The electrowetting display device of claim 10, further comprising a wall over the second support plate, the wall configured to block an amount of light from entering the sensor.

18. The electrowetting display device of claim 10, wherein at least one sensor of the set of sensors comprises at least one of a photodiode, a bolometer, a charge-coupled device, a photoresistor, or a phototransistor.

* * * * *